(12) United States Patent
Brikho

(10) Patent No.: US 6,592,029 B2
(45) Date of Patent: Jul. 15, 2003

(54) SYSTEM AND METHOD FOR GATHERING CUSTOMER INFORMATION FOR COMPLETING CHECK CASHING TRANSACTIONS

(76) Inventor: Ghassan Brikho, 28120 Universal Dr., Warren, MI (US) 48092

( * ) Notice: Subject to any disclaimer, the term of this patent is extended or adjusted under 35 U.S.C. 154(b) by 51 days.

(21) Appl. No.: 09/784,992

(22) Filed: Feb. 16, 2001

(65) Prior Publication Data

US 2002/0113122 A1 Aug. 22, 2002

(51) Int. Cl.⁷ .............................................. G06F 17/60
(52) U.S. Cl. ....................... 235/379; 235/380; 235/381; 235/382
(58) Field of Search ................................ 235/379, 380, 235/382, 381, 375; 705/44, 43, 45

(56) References Cited

U.S. PATENT DOCUMENTS

| | | | | |
|---|---|---|---|---|
| 4,109,238 A | * | 8/1978 | Creekmore | 235/379 |
| 4,187,498 A | * | 2/1980 | Creekmore | 235/379 |
| 4,672,377 A | * | 6/1987 | Murphy et al. | 235/375 |
| 5,305,196 A | * | 4/1994 | Deaton et al. | 705/14 |
| 5,341,428 A | * | 8/1994 | Schatz | 713/185 |
| 5,386,104 A | * | 1/1995 | Sime | 235/379 |
| 5,544,043 A | | 8/1996 | Miki et al. | 235/379 |
| 5,592,377 A | | 1/1997 | Lipkin | 395/242 |
| 5,594,226 A | * | 1/1997 | Steger | 235/375 |
| 5,604,802 A | * | 2/1997 | Holloway | 380/280 |
| 5,748,780 A | * | 5/1998 | Stolfo | 382/232 |
| 5,781,654 A | | 7/1998 | Carney | 705/45 |
| 5,832,464 A | | 11/1998 | Houvener et al. | 235/379 |
| 5,890,141 A | | 3/1999 | Carney et al. | 705/45 |
| 5,897,625 A | * | 4/1999 | Gustin et al. | 109/24.1 |
| 5,978,648 A | | 11/1999 | George et al. | 434/362 |
| 6,036,344 A | | 3/2000 | Goldenberg | 235/379 |
| 6,038,553 A | | 3/2000 | Hyde, Jr. | 235/379 |
| 6,073,121 A | | 6/2000 | Ramzy | 235/379 |
| 6,105,011 A | | 8/2000 | Morrison, Jr. | 705/45 |
| 6,119,933 A | * | 9/2000 | Wong et al. | 235/380 |
| 6,145,738 A | * | 11/2000 | Stinson et al. | 235/379 |
| 6,149,056 A | | 11/2000 | Stinson et al. | 235/379 |
| 6,308,887 B1 | * | 10/2001 | Korman et al. | 235/379 |
| 6,390,362 B1 | * | 5/2002 | Martin | 235/379 |

OTHER PUBLICATIONS

Secure Check Cashing System—System Features—2 pages.

* cited by examiner

Primary Examiner—Michael G. Lee
Assistant Examiner—Uyen Chau N Le
(74) Attorney, Agent, or Firm—Gifford, Krass, Groh, Sprinkle, Anderson & Citkowski, P.C.

(57) ABSTRACT

A system and method for assisting a commercial retailer in gathering customer information necessary to complete a check-cashing transaction. A computer readable and writeable media includes a program operating platform and a software program loaded into the operating platform. The program includes a main menu screen and a plurality of individual customer information screens containing records of each customer within the system. In the absence of an existing customer record, a new record can be created utilizing a variety of multi-media components including a keyboard, digital camera, digital scanner, and digital fingerprint unit. The system further includes the ability to display and to print out information particular to checks presented by customers, such information including paid/refused status and additional check history information. An additional feature of the system and method is the ability to network connect a plurality of the individual and retail located systems in order for any one retailer to share information, such as pertaining to bad checks, with all of the participating systems.

10 Claims, 16 Drawing Sheets

SYSTEM AND METHOD FOR GATHERING CUSTOMER INFORMATION FOR COMPLETING CHECK CASHING TRANSACTIONS

BACKGROUND OF THE INVENTION

1. Field of the Invention

The present invention relates generally to check verification systems utilized in the process of completing a commercial transaction. More particularly, the present invention is a simplified, yet effective, system and method incorporating existing PC and on-line technology capable of being situated on-site at smaller and medium sized commercial retail operations and for the purpose of gathering necessary customer information and establishing necessary verification in the completion of such a check cashing transaction.

2. Description of the Prior Art

Check cashing technology is fairly well known in the art, the purpose for which being to determine as much information as possible regarding a presenter of a check for cashing and before funds are distributed in consideration for the presented check. Check cashing is typically a business for profit, however the concern is that the check presented will ultimately be refused payment by the bank upon which it is drawn, such as for insufficient funds. As such, it is in the interest of the check cashing establishment to be able to secure as much information as is possible regarding the check presenter and before making a decision as to whether the check will be honored.

U.S. Pat. No. 6,149,056, issued to Stinson, et al., discloses an automated and unmanned check-cashing unit. The unit is disclosed as including a processor and a remotely located and central service center which services a number of end-user located check cashing apparatuses, each of which may further include a touch screen display and/or numeric keypad input and a synthesized speaker output. The central service center (or server) typically includes a storage device with a database of customer information and a processor with established criteria for accepting or rejecting a check, based upon the information transmitted from the selected end user apparatus. The central processor is further disclosed as utilizing the input signals to access the database of customer information to obtain data regarding the customer, such as including biometric information, i.e., image of customer's face, and fingerprint.

It is noted however that Stinson does not teach or suggest a system tailored for detailed and complete data gathering at a local store or other commercial retail establishment. It has been found that cost and effort necessary to access to enormous central databases containing millions of entries is often not required in view of the fairly limited number of customers who may actually present a check for cashing. Stinson further does not teach or suggest how particular types of biometric information, beyond photographs taken by a camera, are obtained and loaded into the system.

The Secure Check Cashing System brochure, notated October, 1999, discloses an initial system for gathering customer information in the determination process of whether to cash a check presented to the commercial retail establishment/payor. The system discloses such features as a software program configured for inputting customer information such as name, address, identification number, as well as a photograph of that customer. The system further provides the ability to view the customer's check writing history, indicating both good checks and bad checks and to assist the system operator in making an informed determination as to whether to honor a check.

Limitations of the earlier Secure Check Cashing System disclosure include the inability to input additional biometric parameters, such as customer fingerprints, as well as the inability to link a first localized database of information contained within a first given system, such as in an on-line manner, with additional and remote databases of information contained in remote and identically configured systems.

SUMMARY OF THE PRESENT INVENTION

The present invention presents a system and method, incorporating existing PC and on-line technology, capable of being situated on-site at smaller and medium sized commercial retail operations, for the purpose of gathering customer information necessary in the completion of such a check cashing transaction. The present invention is further intended as a simplified and non-obvious improvement over prior art check verification systems in that it allows for more complete data-gathering and data retention of the group of customers particular to a given commercial retail establishment and at the retail location (such typically being repeat customers) and further allows the retailer to more accurately track the check cashing records of such customers. The system and method of the present invention further permits any number of the individual systems to be networked, such as through an Internet connection, and so that the system software may transfer bad check information to the subscribers.

The system according to the present invention includes the provision of a computer readable and writeable medium, such as a PC or desktop computer with a monitor, hard drive and program-operating platform and software program executable from the operating platform. The program establishes within the PC a localized database at the commercial retailer location and includes a main menu screen and a plurality of individual customer information screens accessible from the main menu, each screen containing records of each customer.

A number of multi-media input devices are utilized to assist in creating records of any new customers and such typically includes a keyboard for accessing written information such as the customer's name, identification number (social security or driver's license), and address. Additional inputs include digital cameras for taking facial (front, side) profiles of the customer, optical scanners for inputting check information (front and back sides), and fingerprint scanner unit for inputting one or more fingerprints of a customer (this providing both an input in creating a new record as well providing an easy means for accessing an existing record).

The software program displays check information, either within an existing customer record or as a separate display screen which breaks down the checks by good (paid) and bad (unpaid or refused) and also provides specifics on the history of the paid/refused checks. A printer is connected to an outlet port of the PC and enables the operator to both print out specific customer and check information for purposes ranging from providing evidence for prosecution of bad check writing to the ability of the retailer to generate check cashing ID's for use by the customer.

A software key is further provided in the networking of the various end user systems and to ensure individual security of the records contained upon each such system combined with the ability of the systems to communicate with each other in a secure and on-line manner and to share bad check information. A reiterated advantage of the system is that it permits localized and detailed databases of customers to be created, maintained and updated by the retailers themselves and shared with one another in a desired networking fashion. This is as opposed to prior art subscription services which require huge centrally located network servers which contain potentially millions of customer entries (most of which are of no interest to a particular commercial retailer of a smaller sized and often non-franchised operation), as well as the attendant costs of participating in such systems.

A method for assisting the retailer in the operation of the present system is also disclosed and includes the steps of searching for an existing computerized record of the customer on a localized database established at the commercial retail location and creating, in the absence of an existing record, a new record for the customer. The step of creating further includes inputting the identification number particular to the customer (social security, driver's license), inputting the customer's name and date of birth. Additional steps include scanning biometric information of the customer including at least one photograph and at least one fingerprint. The checks presented by the customer are also scanned (front and back) into the record. The checks cataloged by history and pay status and may be accessed from either a given customer information screen or a further screen listing checks by paid/refused headings. Still additional steps include printing the customer identification, biometric information and checks/check history for purposes again ranging from producing check cashing identifications to providing evidence for legal prosecution of cashing bad checks.

The present invention also discloses a software program embodying a computer code for use with the PC system. Subroutines of the program include the listing of existing customers and customer profile records, the establishment of new customer records utilizing the various inputs, and the presentation and display of customer and check information for verification or refusal, for network communication to other systems, and/or for printout.

DETAILED DESCRIPTION OF THE DRAWINGS

Reference will now be made to the attached drawings, when read in combination with the following detailed description, wherein like reference numerals refer to like parts throughout the several views, and in which:

FIG. 11 is an optional and verification screen for confirming the customer's fingerprint and which cooperates with a customer verification button located in the customer information screen of FIG. 3a;

DETAILED DESCRIPTION OF THE PREFERRED EMBODIMENTS

Figure 1:
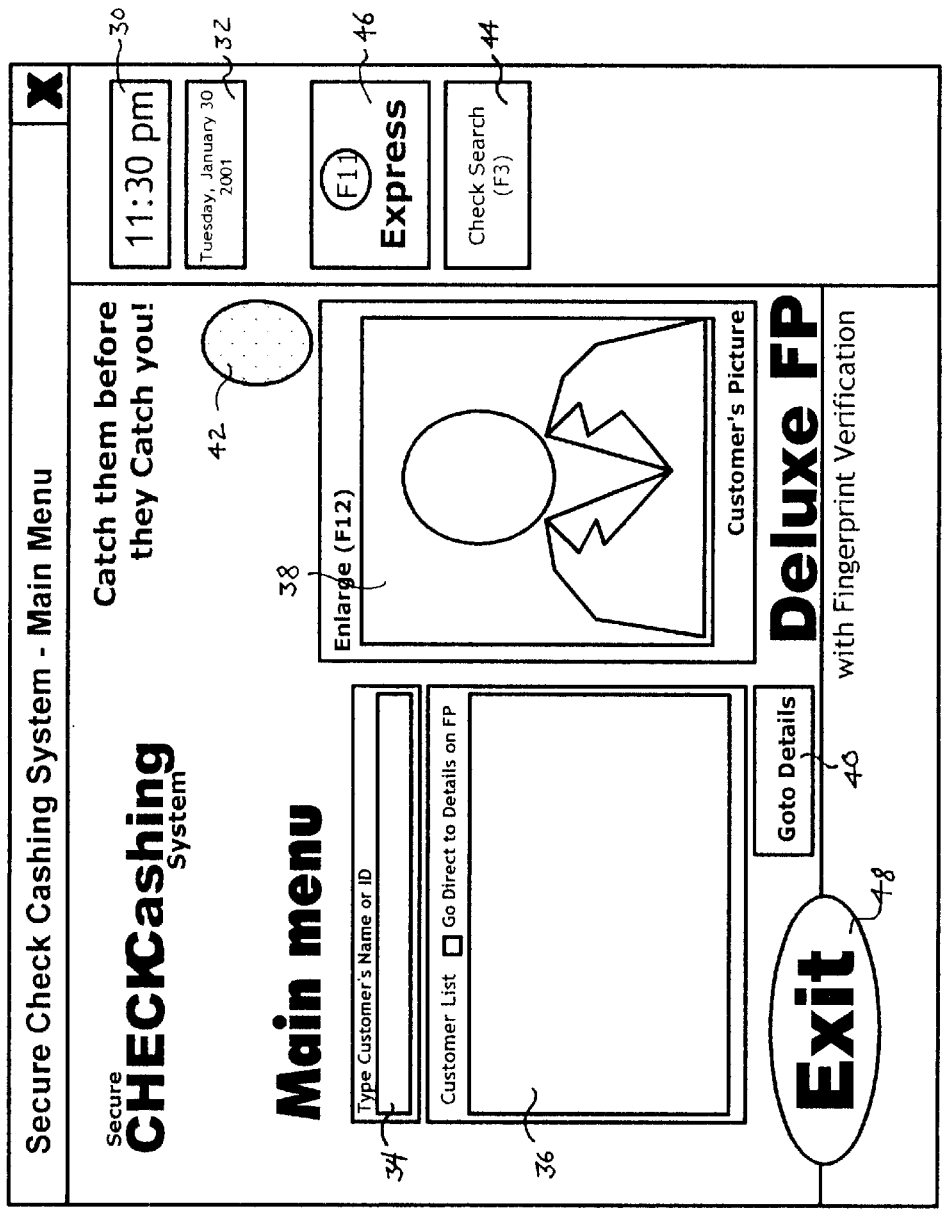
FIG. 1 is an illustration of a main menu screen of the system and method of the present invention and from which can be accessed any existing customer records.

Referring now to FIG. 1, a main menu screen is illustrated at 10 of a system, incorporating existing PC and on-line technology capable of being situated on-site at smaller and medium sized commercial retail operations, for the purpose of gathering customer information necessary in the completion of check cashing transactions. As also previously stated, the present invention is further intended as a simplified and non-obvious improvement over prior art check verification systems in that it allows for more complete data-gathering and data retention of that group of customers particular to a given commercial retail establishment and at the retail location (such typically being repeat customers) and again allows the retailer to more accurately track the check cashing records of such customers. The system further permits any number of the individual systems to be networked, such as through an Internet connection, and so that the system software may transfer bad check information to the subscribers.

Figure 15:
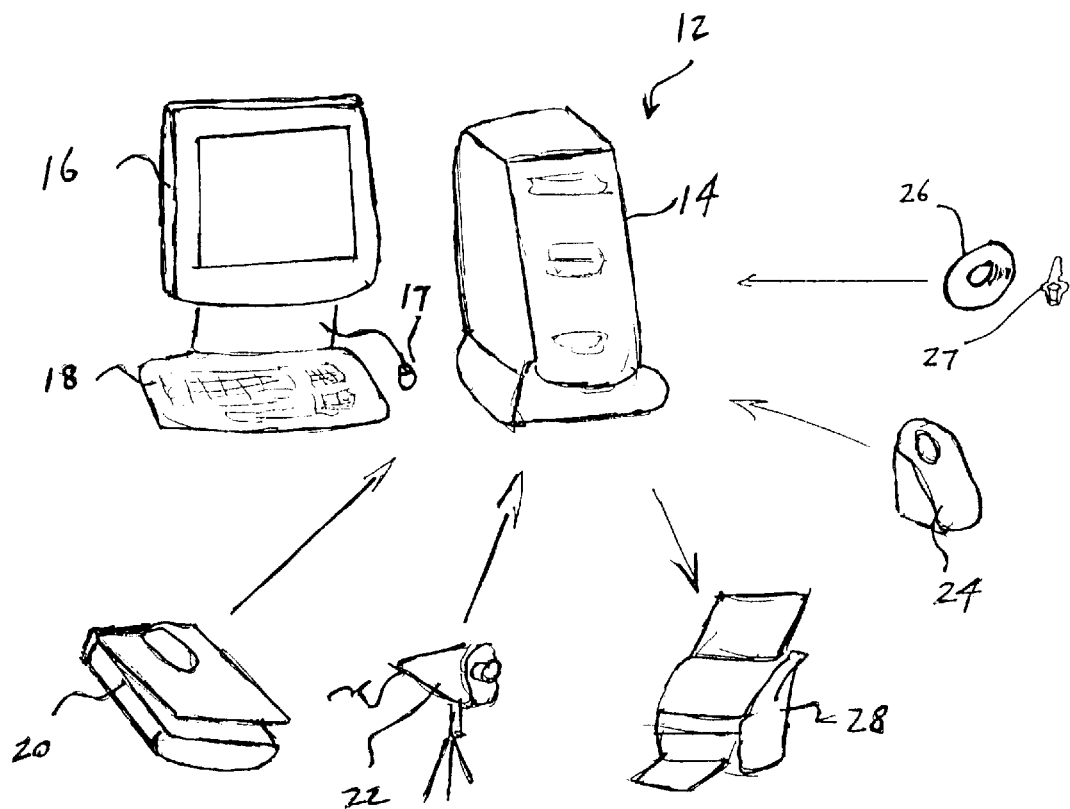
FIG. 15 is an illustration of the various hardware and multi-media components contributing to the system and method of the present invention.

Referring further to FIG. 15, a hardware illustration is shown of the various components of the check cashing system and which includes a computer readable and writeable media in the form of a computer hard drive 14, monitor 16, mouse 17 and keyboard input 18. Additional multi-media input components, the purpose for which will be further described in more detail, also include a color scanner 20, digital camera 22, digital fingerprint scanning unit 24. A CD Rom 26 (corresponding to the software program of the invention) is separately loaded into the hard drive and a software key (symbolically represented at 27) is also included for providing security access to the system during direct operation as well as during networking communication with additional individual systems (as will be further described).

In one preferred application, the PC may be a Pentium III, 850 Megahertz computer with 17" Monitor, 20 gig hard drive, 56 K modem, 40× or higher CD Rom, 8 gigabyte tape backup, keyboard and mouse. The hard drive may operate off of a Windows 98® operating platform and the drive further includes at least four input USB ports for access by the keyboard 18, scanner 20, digital camera 22 and fingerprint scanner unit 24 as well as two printer ports for outputting to color printer 28. Additional specifics of some of the multi-media hardware components include the digital camera 22 being provided as a QuickCAM Express Camera, the scanner 20 as a Canon CanoScan FB63OU, and the printer 28 as a Lexmark 3200 Color Printer. The fingerprint unit 24 can be adapted for use in secure check cashing and may be provided, for example, as a unit produced from such as World Computer Security Corporation and interfaced with the system program with additional software input for inputting, converting and digitally representing the individual's fingerprints.

Referring back to FIG. 1, the illustration 10 of the main screen display is the first screen accessed by the check cashing clerk, or other individual (not shown), and includes such time and date identifiers as current time 30 and date 32. Information on existing customers may be accessed by typing in a customer's name or identification number (social security number, driver's license, etc.) in entry field 34. Box 36 lists all existing customers within the system, again by such as name and identification number, and box 38 displays a photograph of a highlighted customer within the box 38. In this fashion, the clerk or other individual is provided one means for quickly confirming the identity of a customer/presenter of a check for cashing.

Figure 2:
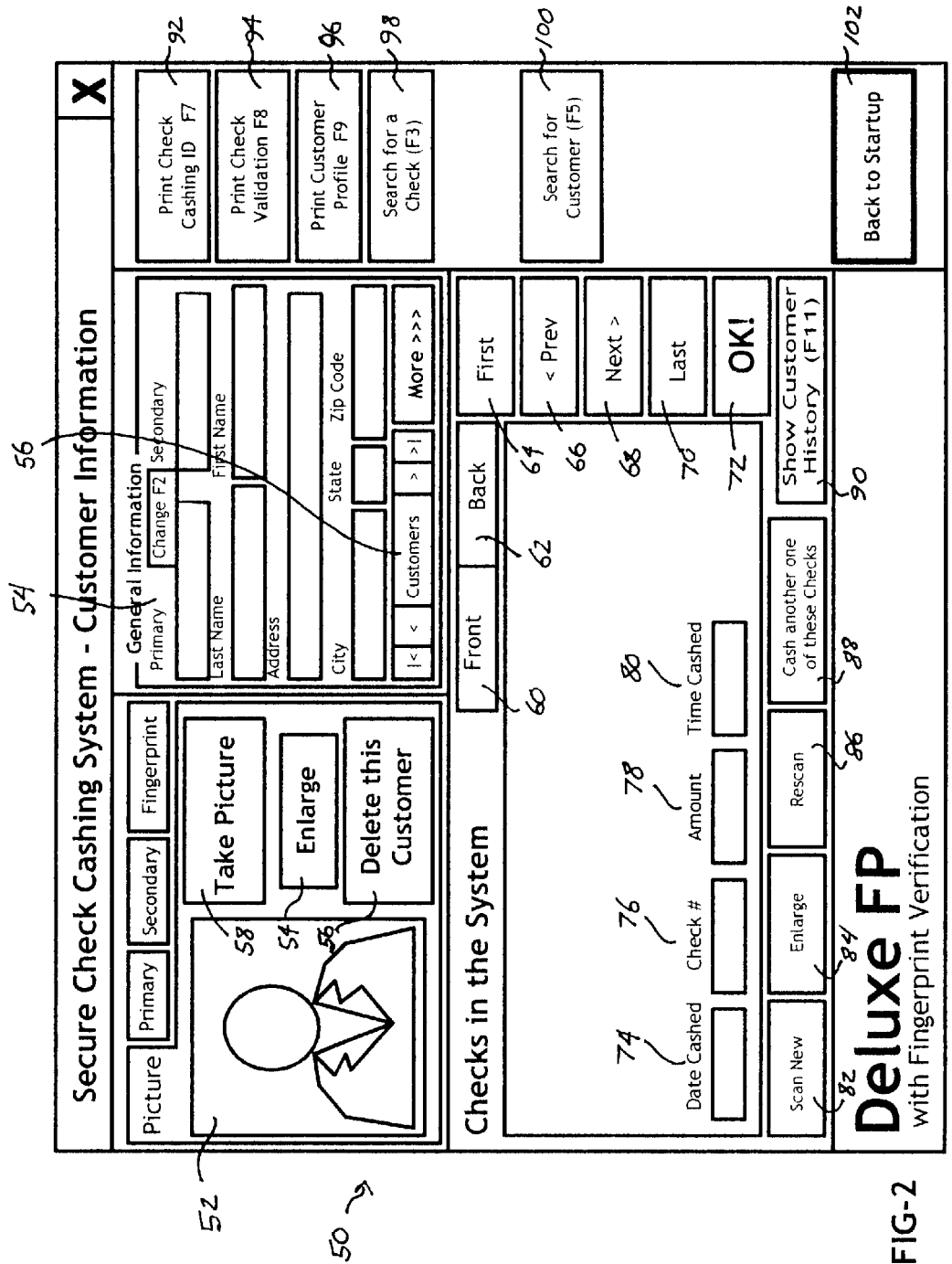
FIG. 2 is a customer information screen accessible from the main menu screen and illustrating a plurality of previously inputted and informational parameters.

Box 40 may be clicked (such as by the operator's computer mouse as well as by double clicking on highlighted entry in box 38) to illustrate a succeeding customer information screen (see further with reference to FIG. 2). The customer may also utilize the fingerprint input unit 24 to match an inputted print with a representation 42 on the main screen 10. Further fingerprint identification and input protocol is set forth with reference to FIG. 3a. Additional features of the main screen display 10 include the ability to search for checks matching a specified customer, by clicking or key entering (F3) in button 44. Creating a record for a new customer can be initiated by clicking on Express button 46 (or by entering F11 on the keyboard) and the protocol for establishing a new record will be further explained with reference to FIGS. 4–12. Finally Exit button 48 allows the operator to exit the system.

Referring now to FIG. 2, details of a customer information screen 50 are illustrated and which represent a record of either an established customer or a record created through the iterative protocol of FIGS. 4–12. A photo illustration of a selected customer is again shown in box 52 and can be enlarged by clicking on button 54. Customer information can be deleted by clicking button 56 and a new picture can be entered by clicking button 58 (and corresponding with activating the digital camera 22). General information section 54 is provided and includes key entered information particular to a specific customer, such as primary and secondary customer designations, first and last names, address, city, state and zip code. Customer scroll panel 56 permits alphabetically listed entries to be accessed in either forward or reverse scrolling fashion.

Box 58 illustrates the checks presented by the identified customer (and which have been previously scanned into the system utilizing the scanner unit 20). Additional features include front button 60 (for illustrating the scanned front of the check), rear button 62 (for illustrating the corresponding rear of the check), first button 64 for illustrating the first or earliest check, previous button 66 for illustrating the next previous check, next button 68 for illustrating the next succeeding check, last button 70 for illustrating the last entered check and OK button 72 to close the box 58. Additional information indicated for each illustrated check includes date cashed 74, check number 76, amount 78 and time cashed 80. Additional input parameters include the ability to scan new checks, by clicking button 82, to enlarge existing illustrated checks (clicking button 84), rescanning a check (button 86), authorizing the cashing of another of a given type of check (button 88) and illustrating a customer history 90 of all checks presented (button 90). Still additional output (or command) button features indicated on the customer information screen 50 include print check cashing ID 92, print customer information on rear of check 94, print customer profile 96, search for new check 98, and search for customer 100. Button 102 returns to the main startup screen 10.

Figure 3:
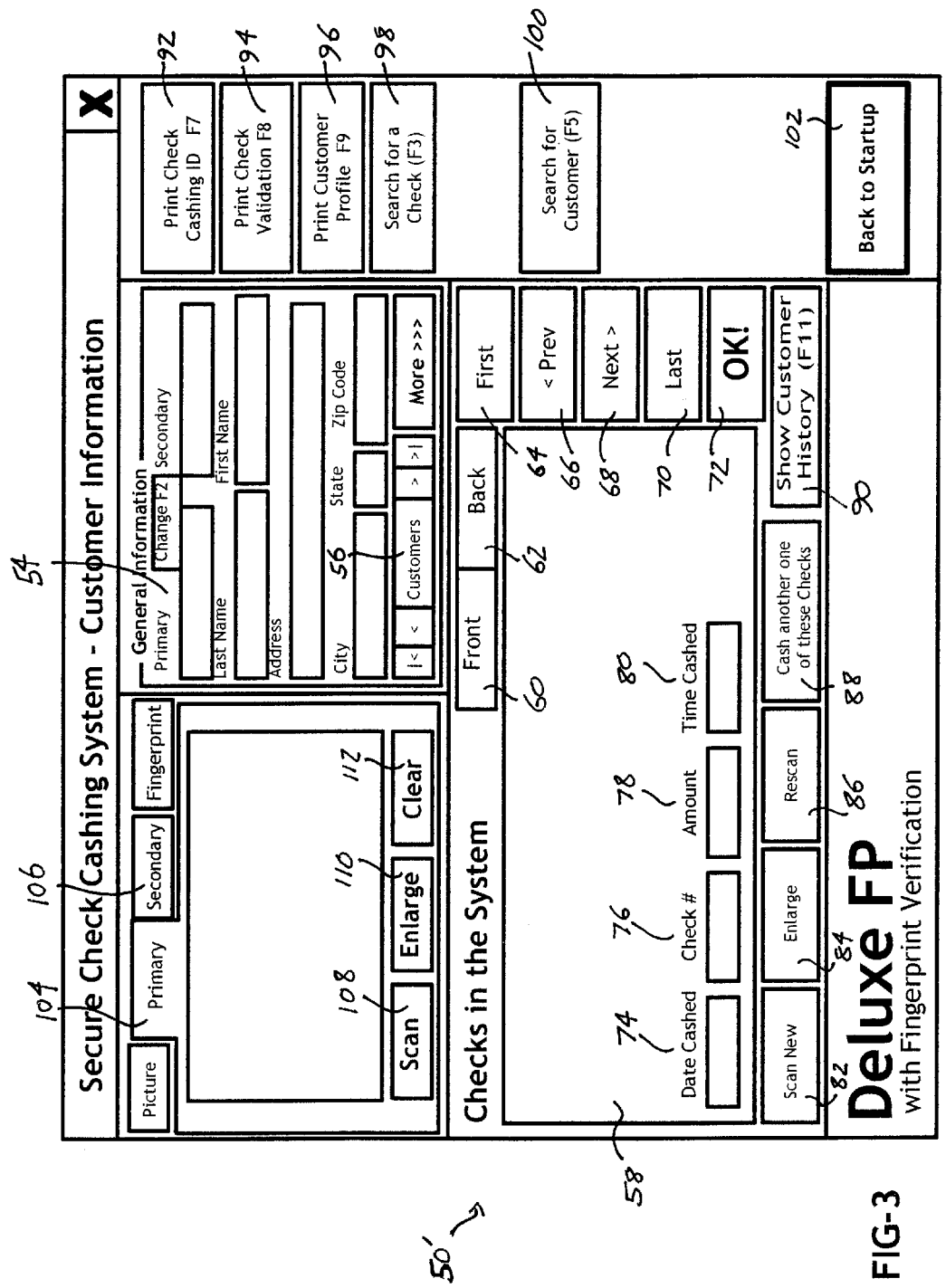
FIG. 3 is a variation of the customer information screen illustrated in FIG. 2 and further showing definable input parameters related to customer biographical information, customer photograph, and scanned checks relevant to the customer.

FIG. 3 illustrates a variation 50' of the customer information screen and in which primary information screen 104 is accessed. By clicking on primary ID screen tab 104, a customer's printed identification, such as driver's license or social security number, can be scanned into the system utilizing also the digital scanner unit 20 or displayed if previously entered. Secondary ID screen tab 106 permits an additional item of identification to be likewise entered. It is also contemplated that two identifications can be stored for two customers on a two party check (and within one account) for easy reference. Scan button 108 is engaged to enter a selected primary 104 or secondary 106 identification, enlarge button 110 zooms in and increases the size of the print or photo on the ID and clear button 112 erases the concurrently presented identification.

Figure 3A:
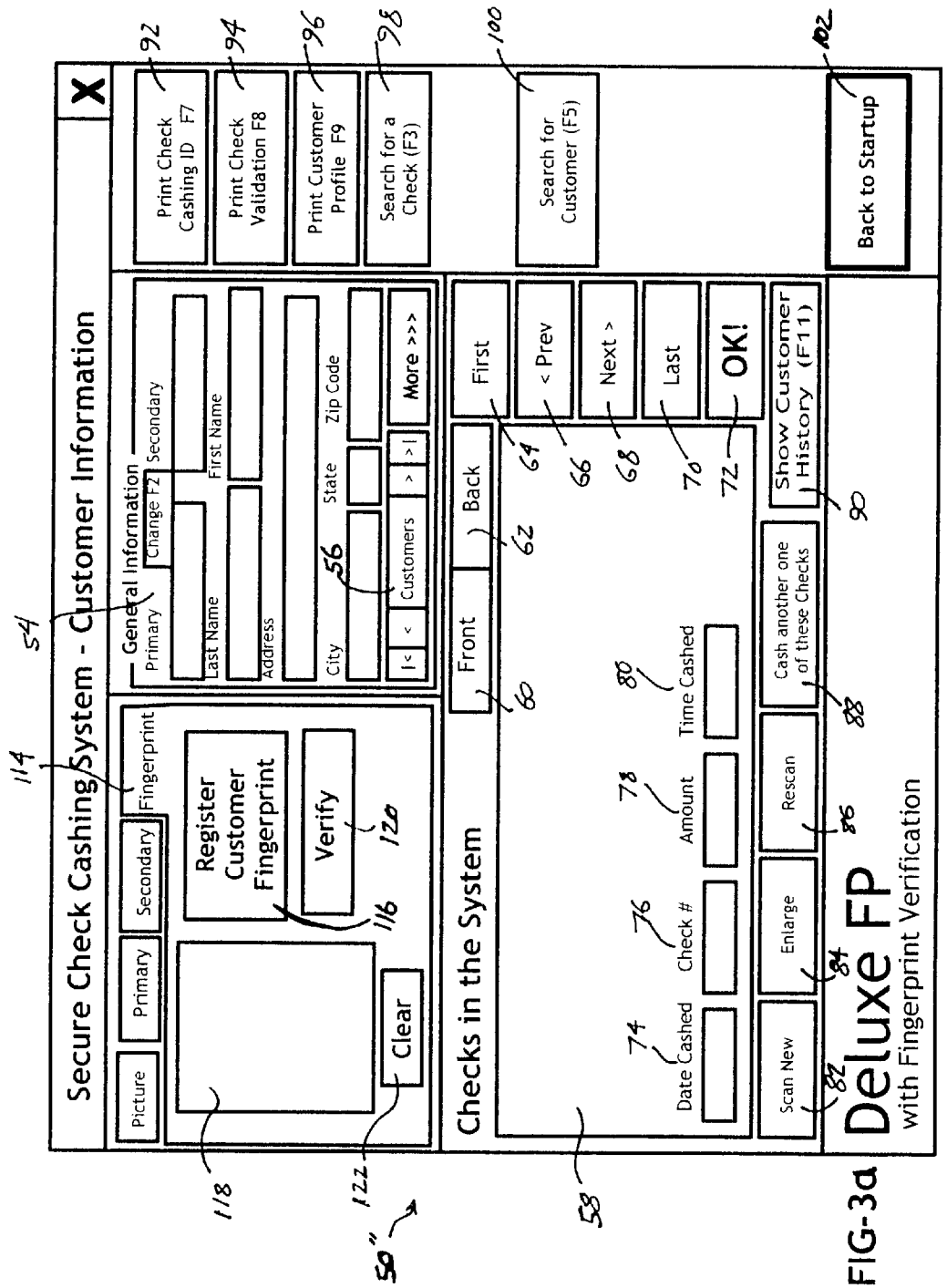
FIG. 3a is a further variation of the customer information screen and illustrating the manner in which one or more customer fingerprints are accessed or inputted into the system.

FIG. 3a illustrates a yet further identification (at 50") of a fingerprint tab 114 for registering and verifying the identity of a check cashing customer. Upon electing tab 114 (as opposed to the picture screen 50 or primary/secondary I.D. screen 50') button 116 is clicked to register the customer's fingerprint, concurrent with the customer placing his fingerprint or thumbprint on the scanner unit 24 previously described and illustrating the digitized reproduction of the print in box 118. Button 120 is engaged to verify the identity of a customer in a previously existing customer information record and button 122 clears the current registration from the system.

The practice of utilizing biometrics in the identification of individuals has grown in recent years and it has been found that, due the uniqueness of individual fingerprint signatures, the system of the present invention can identify individuals within a 0.001 percent error ratio. Embedded within each customer's file is a unique sequence of information, identifying their fingerprint, and which the system uses to determine who is at the other end of the scanner. The system further contemplates collecting four (4) fingerprint samples for best results.

In view of the above explanation of hardware and software components (including main menu screen 10 and individual customer information screens 50, 50', 50") of the system, explanation will now be made of the protocol for entering information (key entered as well as biometric) into the system. As previously explained, the creation of a record for a new customer can be initiated, such as by clicking Express button 46 on the main menu screen 10 or depressing the F11 key on the keyboard.

Figure 4:
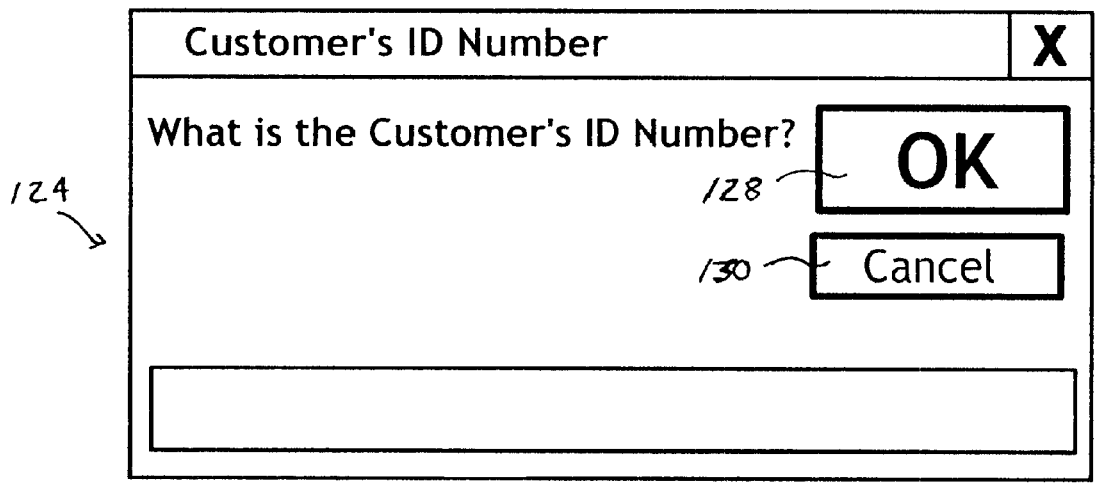
FIG. 4 is a screen illustrating a first inputtable parameter for a new customer record, i.e., customer identification number.

Referring first to FIG. 4, customer I.D. screen 124 is provided first and includes a designated field 126 for entering an identification number such as a social security number, driver's license number or other state identification. By clicking on OK button 128 (or pressing Enter on the keyboard), the system confirms that there are no other customers in the system with the same identification, and to thereby prevent duplication. Button 130 may be clicked to cancel the information, such as in the event of a match or error in entry.

Figure 5:
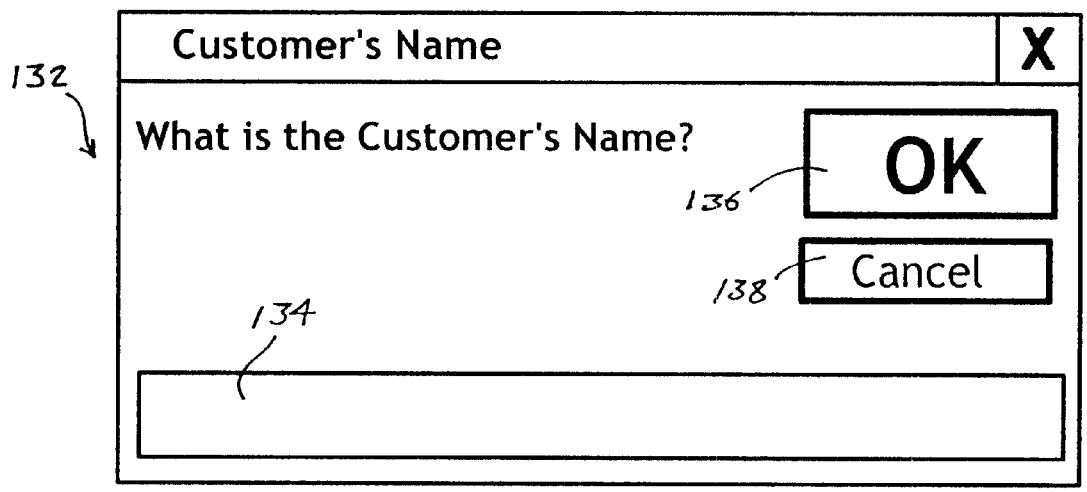
FIG. 5 is a succeeding screen illustrating an inputtable parameter for a new customer's name.

Referring further to FIG. 5, customer name screen 132 next requests entry, in field 134, of the name of the new customer, such by key entering first and last names of the customer. Again, OK button 136 (or Enter key) confirms the entry of the customer name and cancel button 138 clears the entry.

Figure 6:
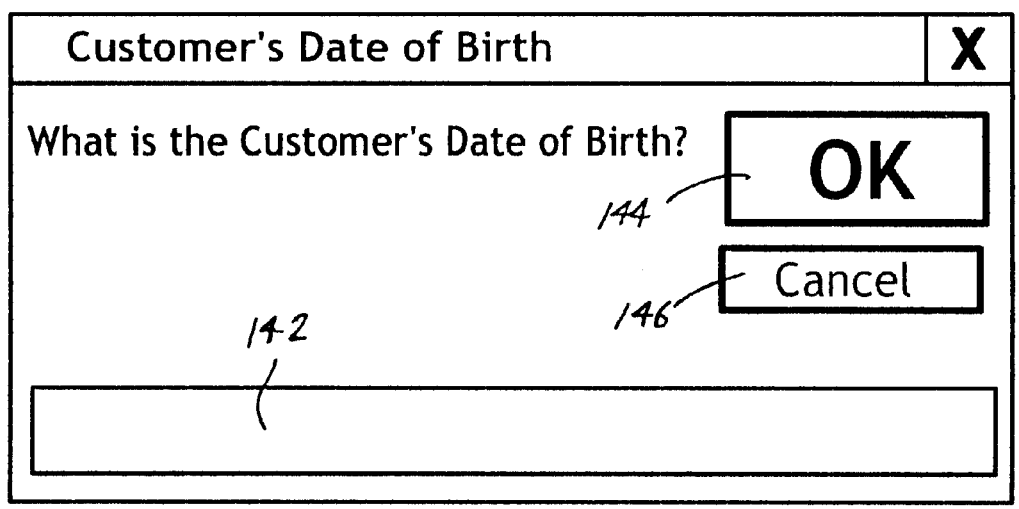
FIG. 6 is a further succeeding screen illustrating an inputtable parameter for a customer's date of birth.

Referring to FIG. 6, customer date of birth screen 140 succeeds customer name screen 132 and requests, in field 142, key entry of the customer's date of birth, e.g., by entering Aug. 11, 1981 representative of Aug. 11, 1981. By clicking on the O.K. button 144 (or again by pressing Enter on the keyboard) the software and system proceeds to the next screen. By clicking on cancel 146, the information is cleared from the screen.

Figure 7:
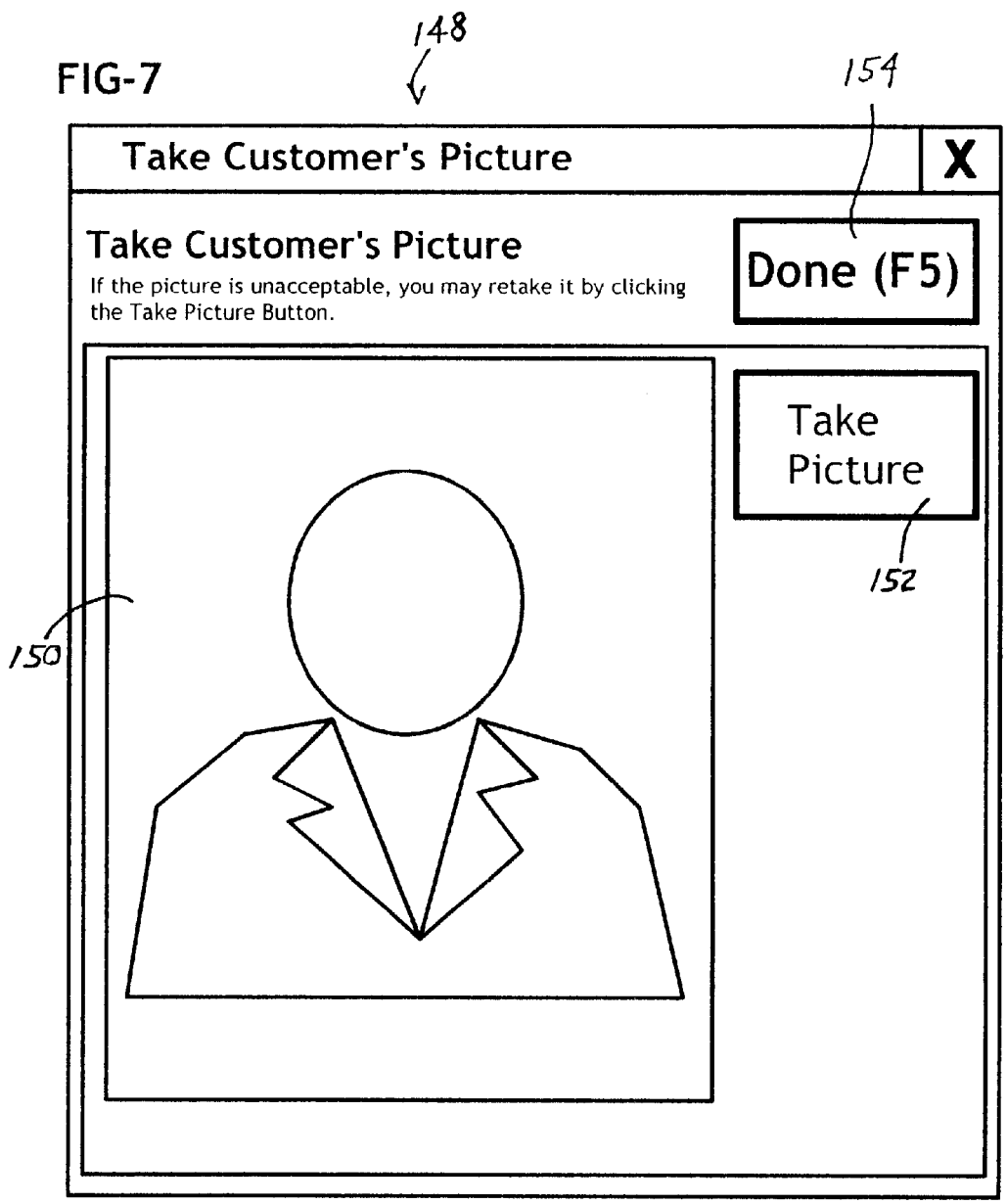
FIG. 7 is a screen illustration which, in cooperation with a digital camera, inputs a customer's photograph into the record.

FIG. 7 illustrates a customer picture screen 148 which is similar to that previously represented as screen portion 52 in the customer information screen 50 of FIG. 2 and in which the digital camera 22 is activated, concurrent with clicking on Take Picture Button 152 (or again keying the Enter symbol), to input a digitized photograph also represented on screen portion 150. The Take Picture Button 152 may also be clicked to clear a prior picture and to retake the customer's picture from any angle, such as front and side profile. Clicking on Done Button 154 advances to the next screen.

Figure 8:
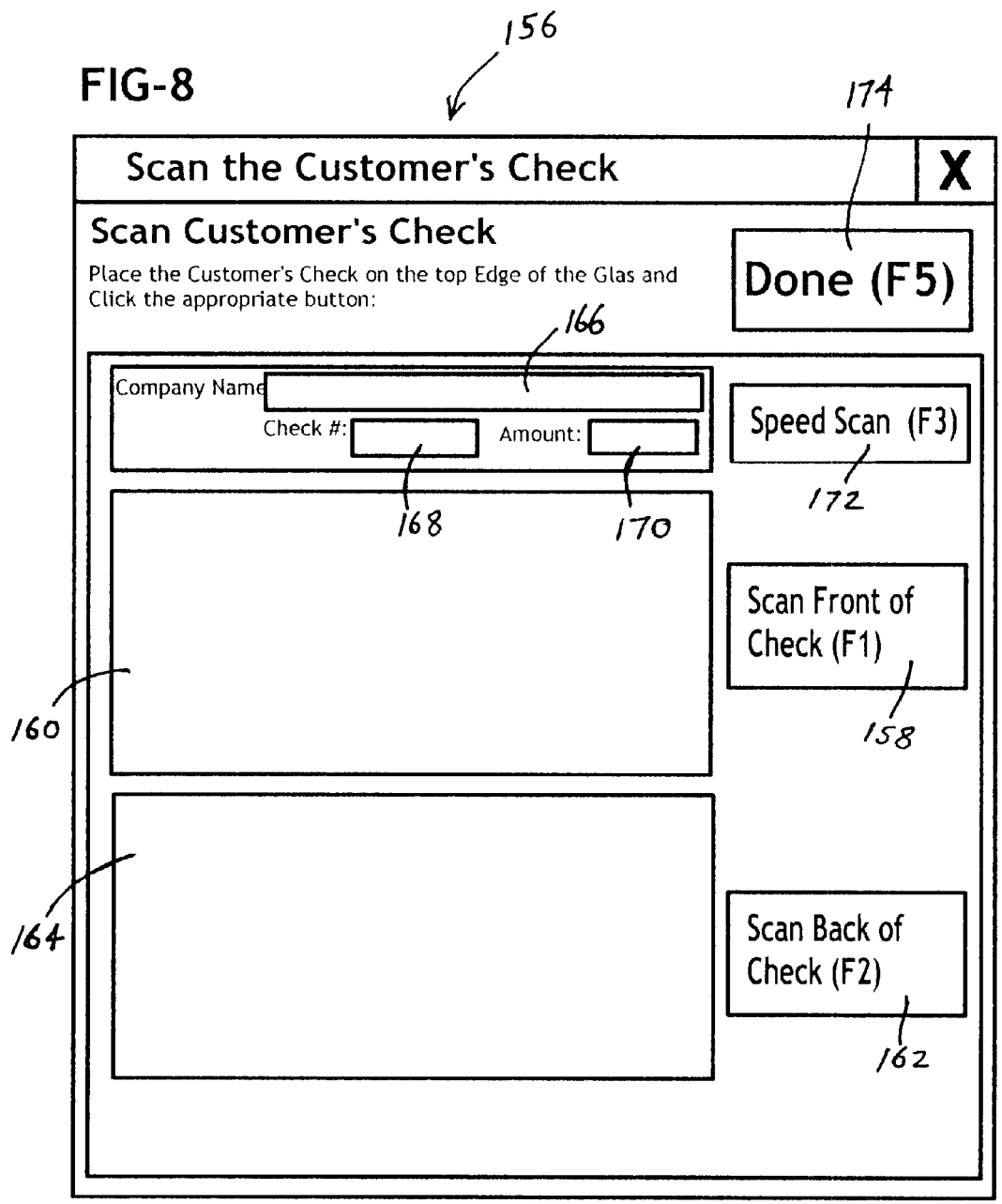
FIG. 8 is a further screen illustration which, in cooperation with a digital scanner, inputs the front and back sides of each check to be entered into the system in addition to entering the name or entity upon which the check is drawn.

Referring now to FIG. 8, screen illustration 156 permits the check-cashing attendant or other operator to digitally scan (through use of scanner 20) and enter the front and back sides of any number of customer checks. Specifically, the check (not shown) is placed upon the top glass edge of the scanner 20 and Scan button 158 (F1 key) is clicked to scan the front of the check and to digitally record and represent the image on screen 160. The Scan button 162 (F2 key) is likewise clicked, upon reversing the check on the scanner 20) to input the digitized version of the rear face upon screen 164. Concurrently, the operator may key enter information such as the company name (or individual) upon which the check is drawn (Box 166), the check number (Box 168) and check amount (Box 170) and in the event that the information is unclearly presented on the digitized replications of the check. Clicking on the Speed Scan Button 172 (F3 key) causes a full page of checks placed upon the scanner unit 20 to be digitally entered, or in the instance in which the operator desires to concurrently enter both the customer's identification and check at the same time. Done Button 174 (F5 key) is clicked to complete this screen.

Figure 9:
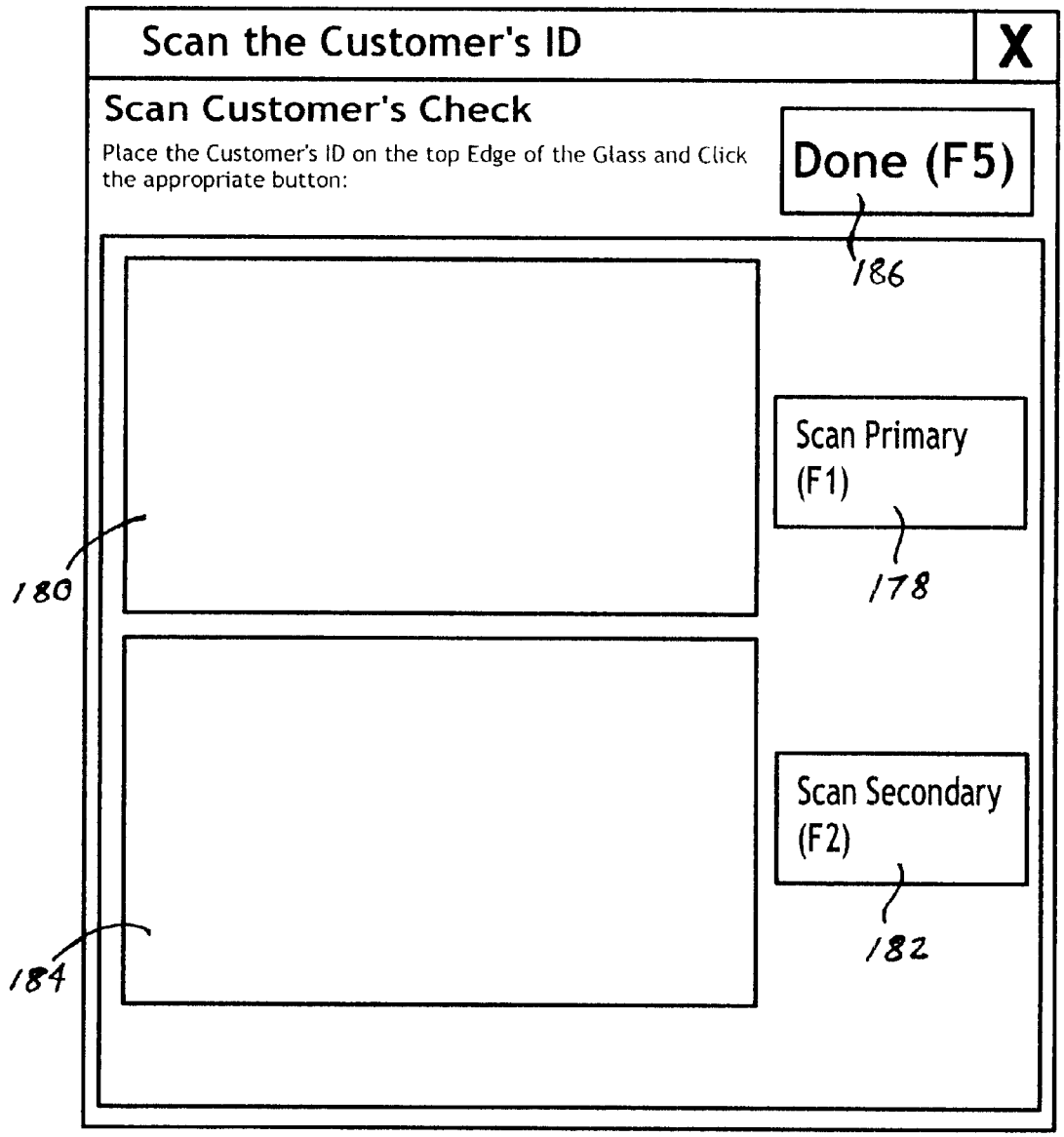
FIG. 9 is a screen illustration which, in cooperation again with the digital scanner, inputs a printed item of customer identification (picture ID, social security card, driver's license, etc.)

Referring now to FIG. 9, screen 176 permits a customer's identification to be scanned into the system (and provided that the customer and operator have not previously elected to include the ID with the check in the Speed Scan Button option 172 of FIG. 8). As with the customer's check previously described, a primary piece of customer I.D. (also not shown) is placed upon the glass face of the scanner unit 20 and, concurrent with clicking on Scan Primary Button 178 (key F1) digitally records and represents the ID in screen 180. A secondary piece of customer I.D. may then be placed on the scanner 20 and, upon clicking on Scan Secondary Button 182 (F2 key), digitally records and represents the additional piece of identification on screen 184. As previously described, this information will then be stored in a customer information screen and accessed by clicking button 104 and 106 (see again FIG. 3, screen representation 50'). By clicking on Done Button 186 (F5 key) the program then advances to the next screen, FIG. 10.

Figure 10:
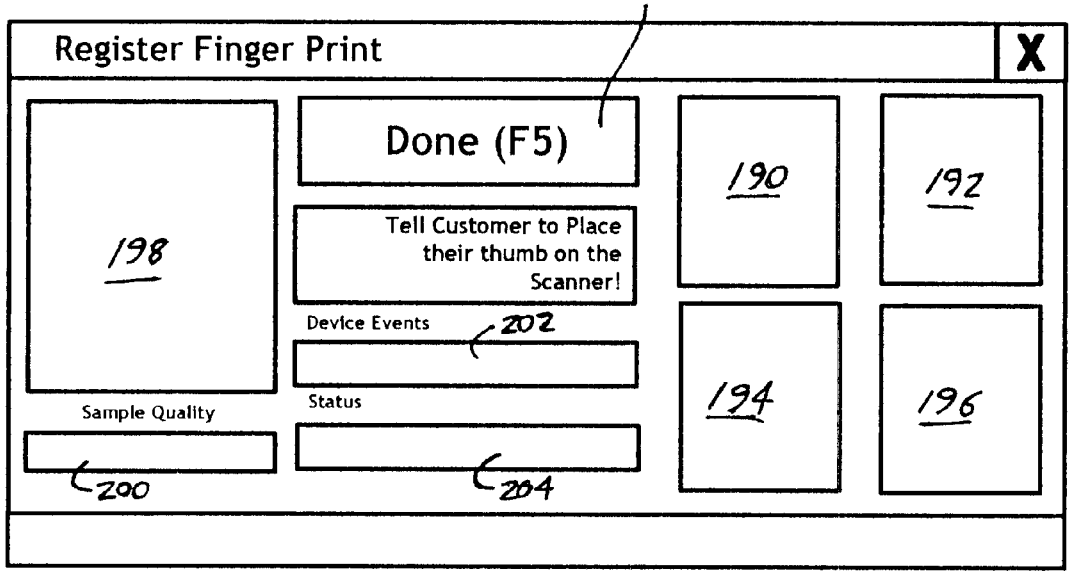
FIG. 10 is a screen illustration which, in cooperation with a fingerprint unit, allows a customer's fingerprint to be inputted into the record.

FIG. 10 illustrates a register fingerprint screen 188 for use with the digital fingerprint scanner unit 24 and which allows the operator to scan into the system at least four clear finger and/or thumb print impressions. These are illustrated in screen portions 190, 192, 194 and 196 identified in the overall screen illustration 188. A sample quality illustration of a fingerprint is illustrated in screen 198 and the system hardware will automatically indicate when the registration is complete. Additional written information, relating to sample quality, device events and status, are listed in fields 200, 202 and 204, respectively, and Done Button 206 (F5) is clicked (or Enter keyed) to complete the fingerprinting step.

Figure 11:
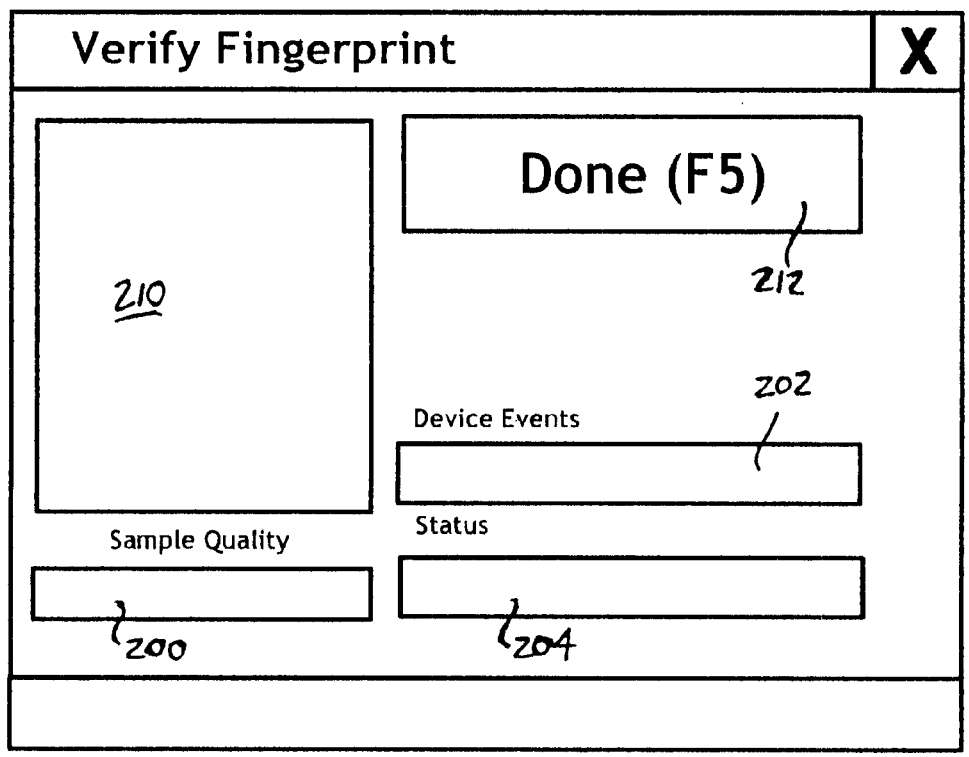

Referring to FIG. 11, fingerprint verification screen 208 is illustrated, functionally similar to the feature previously indicated at 120 in the customer screen illustration 50" of FIG. 3a, and which, upon the customer placing his finger or thumb on the scanner unit 24, opens to verify that the identity of the customer. This may also be accomplished through a match print (or even the customer's picture) being presented in screen portion 210. Upon clicking Done Button 212 (key F5) the fingerprint verify screen 208 closes.

Figure 12:
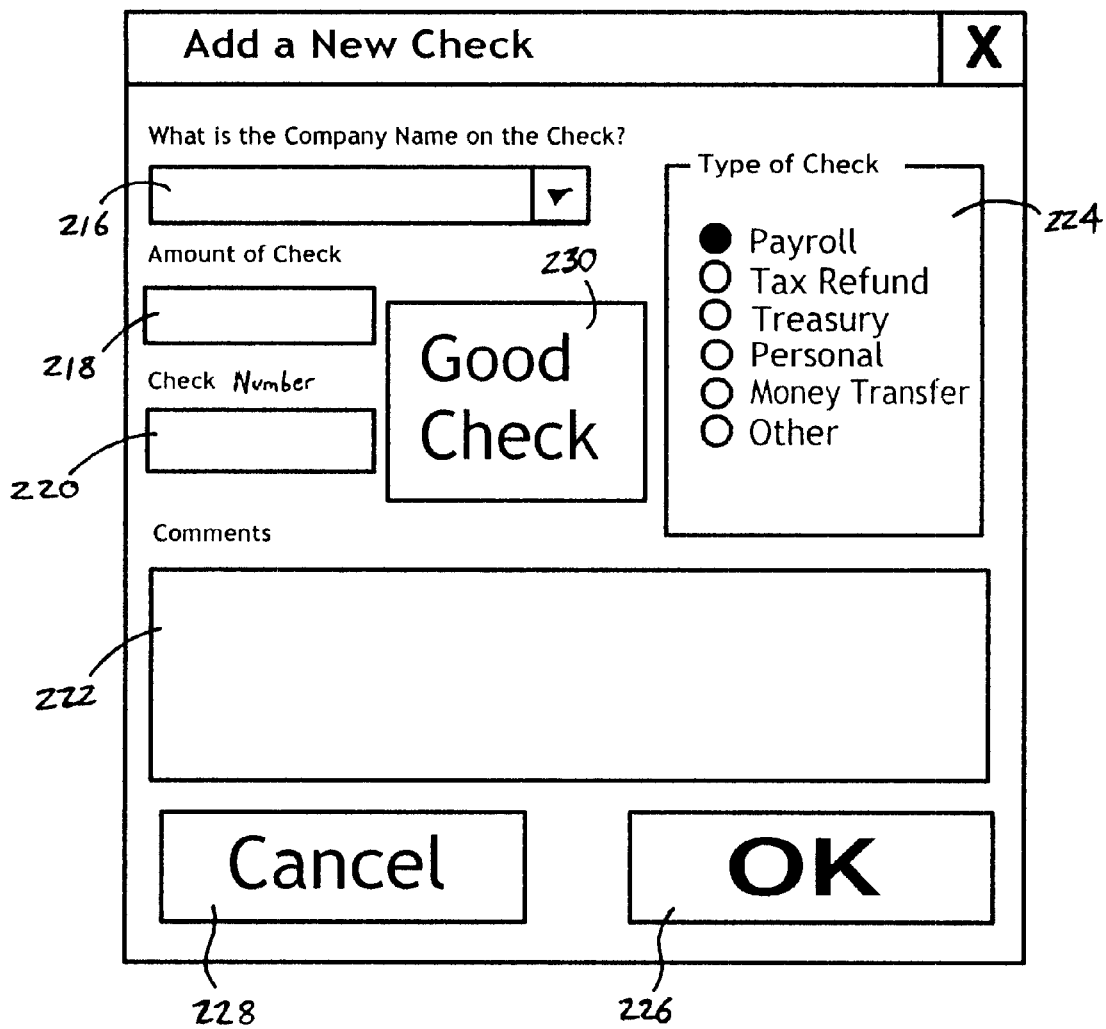
FIG. 12 is a screen illustration, accessible from the customer information screen, and for entering revised information pertaining to a newly entered check, such including a new payor, and in cooperation with scanning front and back sides of the check.

Referring now to FIG. 12, screen illustration 214 is shown for allowing the check cashing attendant or other system operator to add a new check to the customer's record and which is accessed by clicking on the afore-described scan new button 82 in the customer information screen 50 of FIG. 2. The advantage of the screen 214 is that it allows the introduction of new checks into an individual's account, such as when a customer changes jobs or the design of their check changes for some other reason. Multiple key entry fields are provided and include field 216 for company name/payor listed on check, field 218 listing the amount of the check, field 220 listing the check number, field 222 for any comments and field 224 for type of check. The OK button 226 is clicked to proceed and, unless cancel button 228 is selected, will automatically scan the check which is placed upon the scanner. A designation, such as at 230, will often appear and which, based upon the system parameters in place, will determine if the check presented is good for payment or is to be refused payment.

Figure 13:
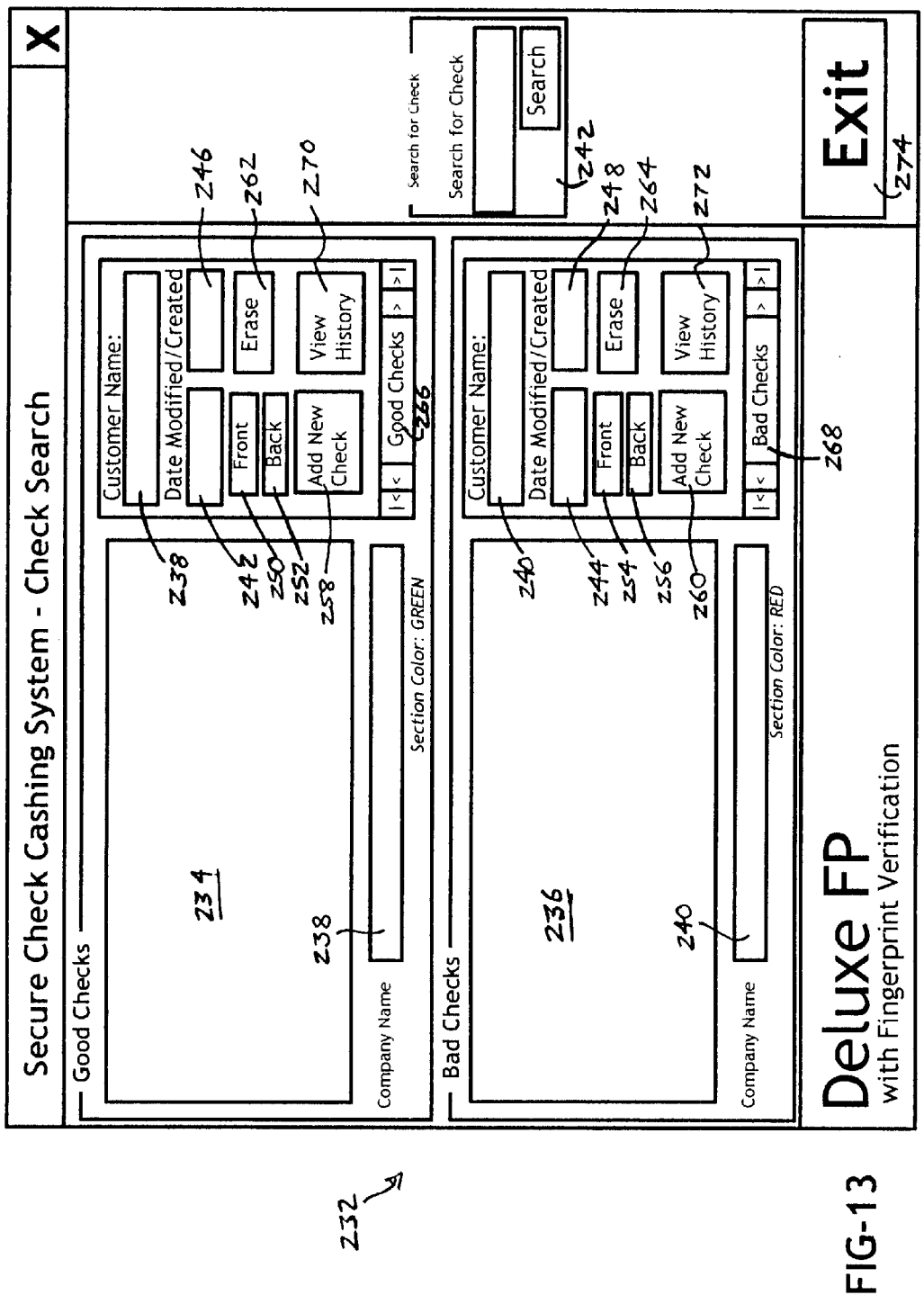
FIG. 13 is a further screen illustration showing the checks entered into the system and broken down by good (paid) and bad (refused) status.
Figure 14:
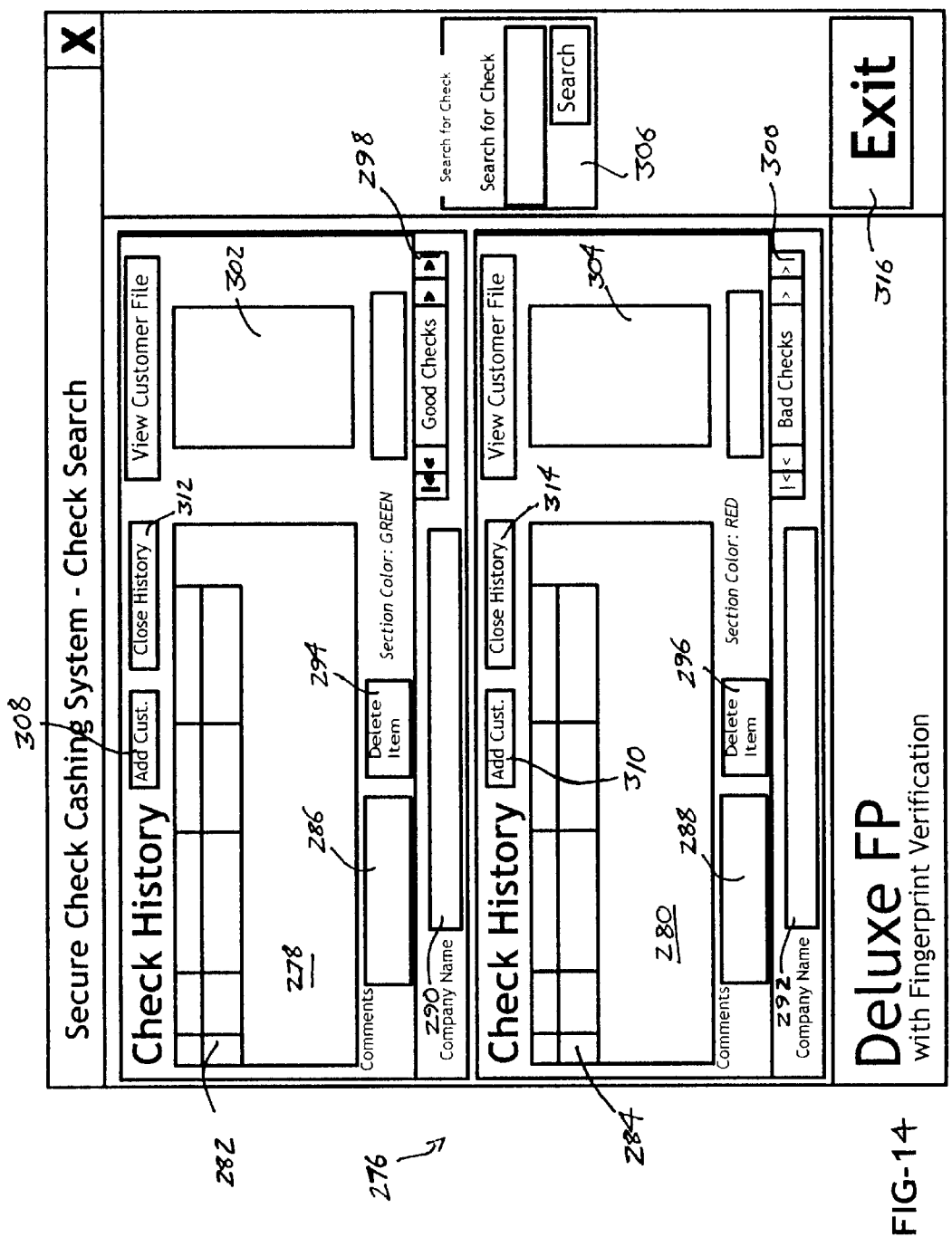
FIG. 14 is a yet further screen illustration, accessible from the good/bad check screen illustration, and showing a check history of each accepted and refused check.

Referring further to FIGS. 13 and 14, in succession, two additional screen illustrations are presented and which break down the checks previously scanned into the system into either good/honored checks or bad/refused checks. Referring initially to FIG. 13, screen illustration 232 is divided into these two main illustrative components, i.e., good checks 234 and bad checks 236. Apart from the main menu screen 10 and various customer information screens 50, the operator has the ability to simply determine whether checks previously presented for payment have been honored or refused. This is also accomplished by searching by company name (payor) and the relevant fields for this search are illustrated at 238 for honored/paid checks and again at 240 for refused checks. A search for any given check, regardless of pay status classification, can be undertaken by clicking on box 242, entering the necessary key word information, and clicking the search button.

As an additional feature, the good check screen 234 is typically outlined with a first color, such as green, and the bad check screen 236 with a second outline or border color, most appropriately red. Additional related information appears in designated fields to the side of both the good and bad check screens 234 and 236, and includes company/payor name 238 (good) and 240 (bad), date modified 242 (good) and 244 (bad), date created 246 (good) and 248 (bad). The front or back of a good check or a bad check can be represented in either of the screens 234 and 236 and such as by clicking on front and back buttons 250 and/or 252 and 254 and/or 256. A new check can be added to the paid/honored classification by clicking on button 258 and to the refused status by clicking button 260. Erase buttons are also listed at both 262 (for good checks) and at 264 (for bad checks). The ability to rapidly scroll through the respective listings 234 and 236 of checks is also provided by scroll bars 266 and 268, respectively. Finally, view history buttons 270 and 272 lead to the illustration of FIG. 14 and Exit button 274 exits the screen.

Referring again to FIG. 14, screen illustration 276 presents check histories of both the good checks (field 278) and bad checks (field 280) and which result from the either or both the view history buttons 270 and 272 being clicked upon. Listed in either field 278 or 280 is information relating to the customer who cashed the check (282, 284) and any comments related to the check (286, 288). Company or payor fields are again illustrated at 290 and 292 for good and back checks, respectively, and delete item buttons are provided respectively at 294 and 296. Scroll bars are again provided at 298 and 300 for scrolling through both good and bad check histories and yet additional features include view customer file fields 302 (good) and 304 (bad), search for check field 306, add customer fields 308 (good) and 310 (bad), close history window field 312 (good) and 314 (bad) and exit field 316.

Figure 16:
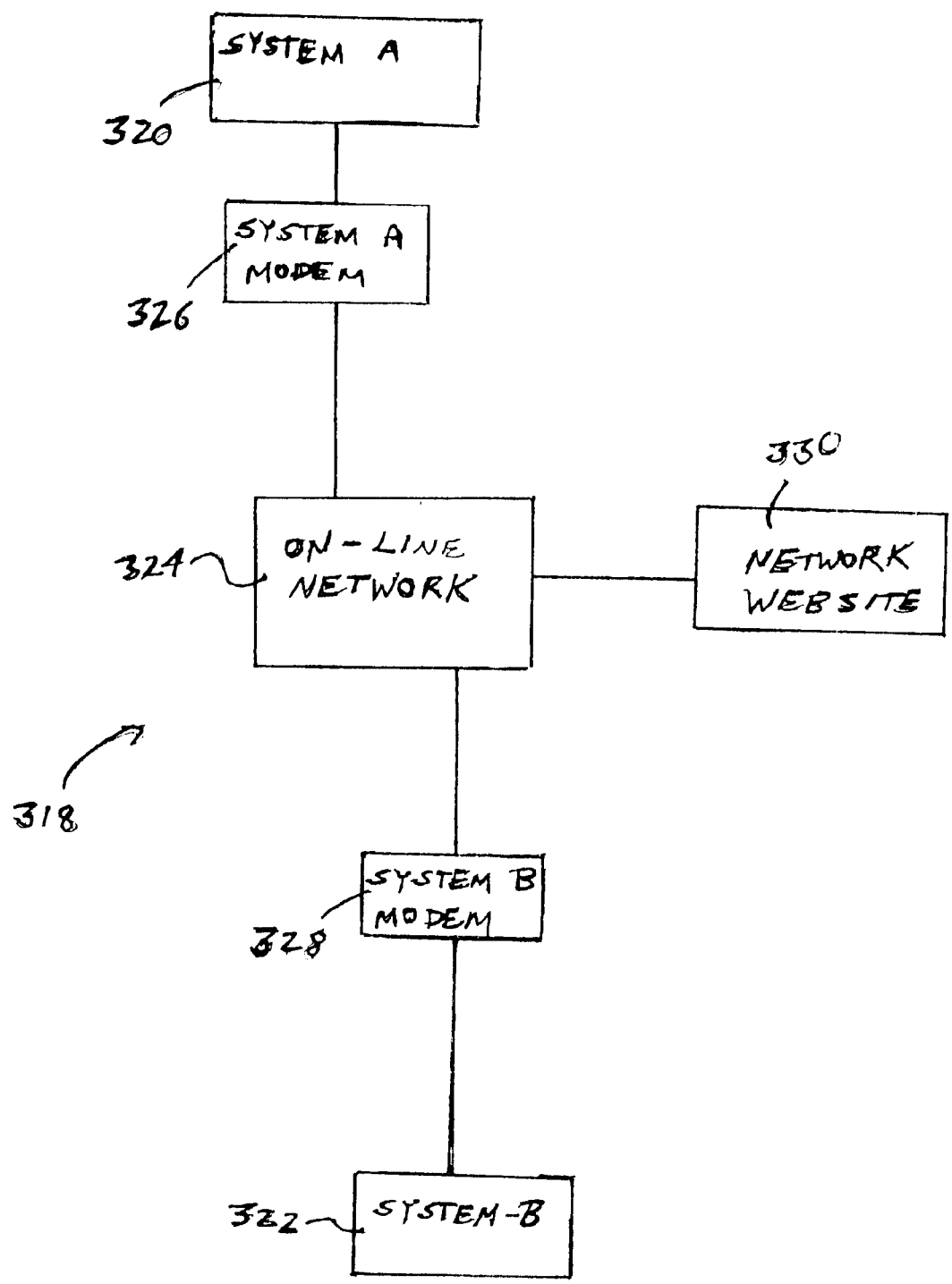
FIG. 16 is a further diagrammatic illustration of the manner of networking a plurality of individual and retail located systems according to the present invention.

Referring finally to FIG. 16, a diagrammatic representation is shown generally at 318 and illustrates the networkability of a first system 320 (as described above) with a second and substantially identical system 322, and such as may be located at another commercial retail location. An on-line network is generally represented at 324 and can be an Internet connection which interconnects the individual systems 320 and 322 through their respective modem connections, 326 and 328. The ability to network connect the respective databases contained within the individual systems 320 and 322 can also be facilitated by the provision of a network website 330 and it is also contemplated that the software keys (such as previously described at 17 in the hardware description of FIG. 15) can be configured to ensure secure on-line file sharing. Specifically, the network aspect of the present invention permits bad check information to be posted by any one system operator and shared by all participating systems in the network.

The present invention also discloses a method for assisting a commercial retailer in gathering customer information necessary to complete a check cashing transaction, including the steps of searching for an existing computerized record of the customer on a localized database established at the commercial retail location, creating, in the absence of an existing record, a new record for the customer, and inputting into the new record information selected from the group including the customer's name and date of birth and identification number. Additional steps include scanning additional biometric information into the new record drawn from the group including at least a fingerprint, scanning into the record at least one check and cataloging the check by history and pay status.

Other method steps are also drawn from the disclosure of the system as previously presented and again include, establishing a network connection between a plurality of individual and localized databases, permitting a selected retailer to transfer bad check information to other retailers subscribed to the network. Still additional steps include printing a check cashing identification card for the customer drawing upon inputted and scanned information, printing the customer identification, biometric information, checks and check history.

Still also disclosed is a software program embodying a computer code for use with the computer readable and writeable media (PC and hardware) for assisting a commercial retailer in gathering customer information necessary to complete a check cashing transaction. The program includes a first subroutine for establishing a listing of existing customers and customer profile records, a second subroutine which, in the absence of an existing customer listed in the first subroutine, utilizes a plurality of multi-media components to establish a record of a new customer and which are selected from a group including a keyboard, a digital camera, a digital camera and digital fingerprint unit. A subroutine incorporates presentation means for illustrating a catalog of checks by history and pay status. An additional subroutine include transmitting check information with additional and remotely located systems throughout an established network and it is further contemplated that the program may be installed upon such as a CD Rom.

Having described our invention, it is evident that it discloses a novel, simplified and improved data gathering system and method for helping, in particular, smaller commercial retail operations to assemble and analyze the necessary information for determining whether to cash a presented check. The ability to assemble and tailor check cashing histories of primarily local patrons within the localized system database provides an improved system not evident in other prior art check cashing systems.

Additional preferred embodiments will become apparent to those skilled in the art to which it pertains, and without deviating from the scope of the appended claims.

I claim:

1. A method for assisting a commercial retailer in gathering customer information necessary to complete a check cashing transaction, said method comprising the steps of:

searching for an existing computerized record of the customer on a localized database established at the commercial retail location;

creating, in the absence of an existing record, a new record for a customer, said step of creating further including inputting an identification number particular to the customer;

inputting into said new record information comprising at least one of the customer's name, date of birth and photograph;

scanning additional customer information into said new record, said additional information comprising biometric information comprising at least a fingerprint;

scanning into said record at least one check; and cataloging said check by history and pay status.

2. The method as described in claim 1, further comprising the step of establishing a network connection between a plurality of individual and localized databases, said network connection further comprising permitting a selected retailer to transfer bad check information to other retailers subscribed to said network.

3. The method as described in claim 1, further comprising the step of printing a check cashing identification card for the customer, said identification card drawing upon said inputted and scanned information.

4. The method as described in claim 1, further comprising the step of printing said customer identification, said biometric information, and said checks and check history.

5. The method as described in claim 1, said step of searching for an existing record further comprising the customer scanning a fingerprint.

6. The method as described in claim 1, said step of searching for an existing record further comprising keyboard entering the customer's name.

7. The method as described in claim 1, said step of searching for an existing record further comprising scanning a list of existing customer records.

8. The method as described in claim 1, said step of inputting an identification number to create a new record further comprising inputting information including at least one of federal social security numbers and stated driver's license numbers.

9. The method as described in claim 1, said step of cataloging said check history further comprising listing scanned checks with information drawn from at least one of pay/refused status, name upon which the check is drawn, and customer/presenter name.

10. The method as described in claim 1, further comprising the step of scanning, to a specified check catalog history and pay status, additional checks.

* * * * *